(12) United States Patent
Fulton et al.

(10) Patent No.: US 8,423,594 B2
(45) Date of Patent: Apr. 16, 2013

(54) REAL-TIME HASH MAP

(75) Inventors: Michael Stephen Fulton, Maple Ridge (CA); Mark Graham Stoodley, Markham (CA)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/874,136

(22) Filed: Sep. 1, 2010

(65) Prior Publication Data

US 2012/0054467 A1    Mar. 1, 2012

(51) Int. Cl.
*G06F 17/30* (2006.01)
*G06F 9/26* (2006.01)

(52) U.S. Cl.
USPC .......................................... 707/902; 711/216

(58) Field of Classification Search .................. None
See application file for complete search history.

(56) References Cited

U.S. PATENT DOCUMENTS

| | | | |
|---|---|---|---|
| 5,960,434 A * | 9/1999 | Schimmel | 1/1 |
| 6,463,270 B1 * | 10/2002 | Chang et al. | 455/403 |
| 6,754,662 B1 * | 6/2004 | Li | 707/693 |
| 7,031,985 B1 | 4/2006 | Pecheny | |
| 7,058,639 B1 | 6/2006 | Chatterjee et al. | |
| 7,287,046 B2 | 10/2007 | Bulka et al. | |
| 7,403,137 B1 * | 7/2008 | Huang | 341/51 |
| 2006/0129588 A1 * | 6/2006 | Hsu et al. | 707/102 |
| 2008/0229056 A1 | 9/2008 | Agarwal et al. | |
| 2009/0215411 A1 * | 8/2009 | Tucker et al. | 455/90.2 |
| 2010/0185703 A1 * | 7/2010 | Ylonen | 707/816 |

OTHER PUBLICATIONS

Demetriades et al., "An Efficient Hardware-basedMulti-hash Scheme for High Speed IP Lookup," 16th IEEE Symposium on High Performance Interconnects, pp. 103-110, 2008.

* cited by examiner

*Primary Examiner* — Tarek Chbouki
(74) *Attorney, Agent, or Firm* — Nelson and Nelson; Daniel P. Nelson; Alexis V. Nelson (57) ABSTRACT

A method for implementing a hash map to improve performance consistency is disclosed herein. In one embodiment, such a method includes providing a hash map comprising a set of tables, the set of tables initially containing a first table. When the first table is full, the method augments the hash map by adding a second table to the set of tables. Similarly, when the second table is full, the method augments the hash map by adding a third table to the set of tables. A similar technique may be used to add additional tables to the hash map. When searching for a value in any of the tables in the hash map, the method uses the same hash code. A corresponding computer program product and apparatus are also disclosed herein.

19 Claims, 7 Drawing Sheets

REAL-TIME HASH MAP

BACKGROUND

1. Field of the Invention

This invention relates to apparatus and methods for implementing a real-time hash map.

2. Background of the Invention

In computer science, a hash table or hash map (collectively referred to hereinafter as a "hash map") is a data structure that is used extensively in different types of software. A hash map uses a hash function to map identifying values, known as keys, to their associated values. The hash function transforms the key into an index (i.e., a hash code or derivative thereof) associated with an array element (a slot or bucket) where the associated value is located or potentially located.

When a hash map is full or has reached a certain load factor (e.g. 75 percent full), various hash map implementations attempt to resize the hash map. For example, in the Java HashMap class, a hash map is automatically resized when the hash map reaches a specified load factor. To resize the hash map, the Java HashMap class allocates a new larger table. Entries from the previous table are then copied to the new table either all at once or gradually over a period of time. Once all entries are copied from the previous table to the new table, the previous table is de-allocated and returned to the free storage pool.

Nevertheless, conventional hash maps such as those implemented by the Java HashMap class suffer from the following shortcomings. First, conventional hash maps are often pre-allocated larger than they need to be to avoid the resize operation, which can negatively affect real-time operation and provide inconsistent performance. Second, Java users working with primitive data types such as strings have no control over the hash codes that are generated for the strings. This typically increases the number of hash collisions that occur in an application. There is little that can be done to address this problem other than to make the hash map larger than it needs to be. Third, in conventional hash maps, hot and cold data is stored together in the same hash map table. As a result, when looking up data in the hash map, collisions may occur between needed data and rarely referenced data, thereby decreasing performance.

In view of the foregoing, what is needed is a hash map that overcomes many of the shortcomings of conventional hash maps. In particular, a hash map is needed that provides consistent real-time performance. Further needed is a hash map that can be resized in an efficient manner with minimal impact on performance. Such a hash map would ideally allow the initial size of the hash map to be made smaller, thus more efficiently utilizing space.

SUMMARY

The invention has been developed in response to the present state of the art and, in particular, in response to the problems and needs in the art that have not yet been fully solved by currently available apparatus and methods. Accordingly, the invention has been developed to provide a real-time hash map that provides greater performance consistency. The features and advantages of the invention will become more fully apparent from the following description and appended claims, or may be learned by practice of the invention as set forth hereinafter.

Consistent with the foregoing, a method for implementing a hash map to improve performance consistency is disclosed herein. In one embodiment, such a method includes providing a hash map comprising a set of tables, the set of tables initially containing a first table. When the first table is full, the method augments the hash map by adding a second table to the set of tables. Similarly, when the second table is full, the method augments the hash map by adding a third table to the set of tables. A similar technique may be used to add additional tables to the hash map. When searching for a value in any of the tables in the hash map, the method uses the same hash code. In selected embodiments, the tables grow in size as they are added to the hash map. For example, each table may be twice the size of the table that preceded it, causing the hash map to grow in an exponential manner.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
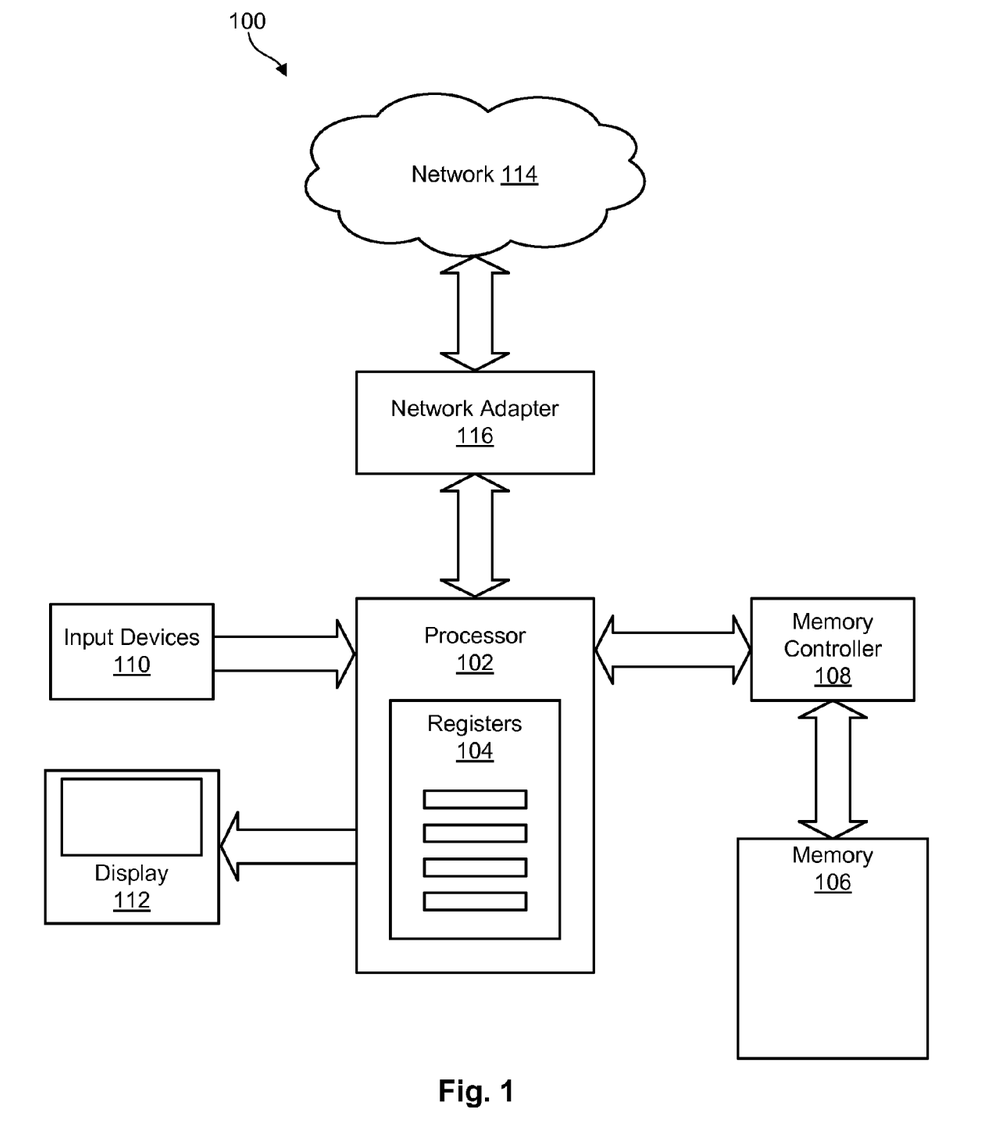
FIG. 1 is a high-level block diagram showing one example of a computer system suitable for use with an embodiment of the invention.

Referring to FIG. 1, one example of a computer system 100 is illustrated. The computer system 100 is presented to show one example of an environment where an apparatus and method in accordance with the invention may be implemented. The computer system 100 is presented only by way of example and is not intended to be limiting. Indeed, the apparatus and methods disclosed herein may be applicable to a wide variety of different computer systems in addition to the computer system 100 shown. The apparatus and methods disclosed herein may also potentially be distributed across multiple computer systems 100.

The computer system 100 includes at least one processor 102 and may include more than one processor. The processor 102 includes one or more registers 104 storing data describing the state of the processor and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
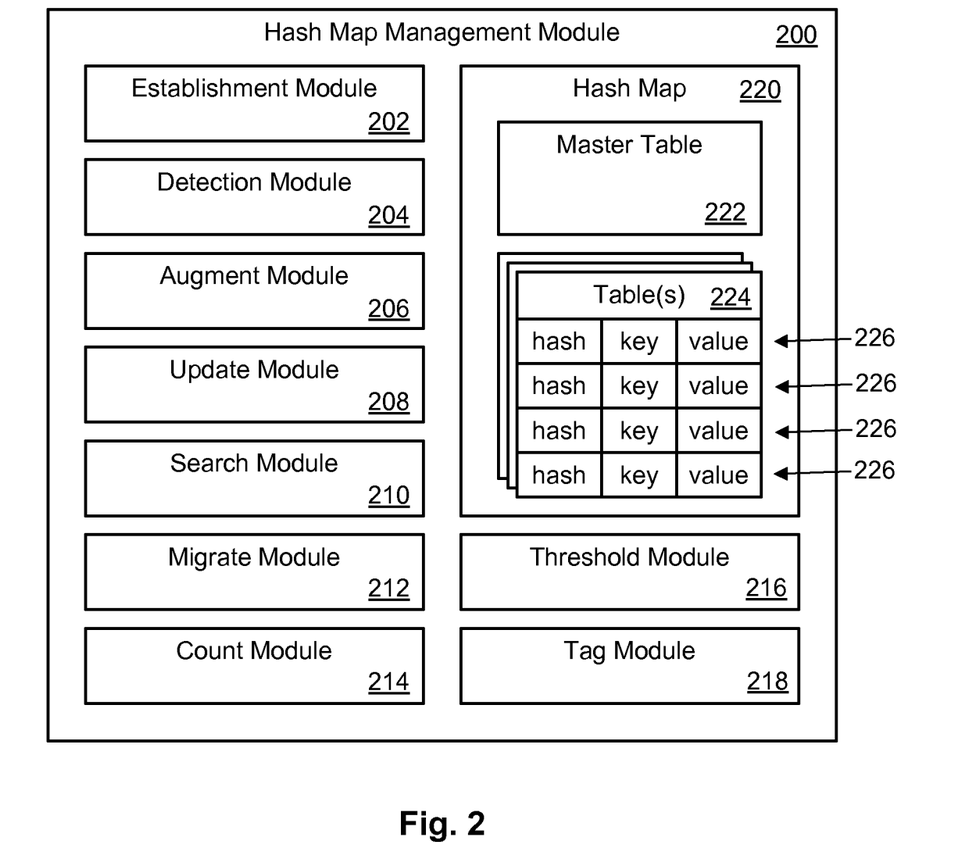
FIG. 2 is a high-level block diagram showing one embodiment of a hash map management module for implementing a hash map in accordance with the invention.

Referring to FIG. 2, in selected embodiments, a hash map 220 may be provided that overcomes various shortcomings of conventional hash maps. In particular, the hash map 220 performs in a substantially consistent manner even when the hash map 220 is augmented because it is full or has reached a specified load factor. This allows the initial size of the hash map 220 to be made significantly smaller since it can be resized with minimal performance impact. As will be explained hereinafter, the design of the hash map 220 reduces collisions between hot and cold data residing in the hash map 220, also improving performance.

In selected embodiments, the hash map 220 is managed by a hash map management module 200. The hash map management module 200 may be implemented in hardware, software or firmware executable on hardware, or a combination thereof. The modules and accompanying data structures are presented only by way of example and are not intended to be limiting. Indeed, alternative embodiments may include more or fewer modules or data structures than those illustrated, or the modules or data structures may be organized differently. Furthermore, it should be recognized that, in some embodiments, the functionality of some modules may be broken into multiple modules or, conversely, the functionality of several modules may be combined into a single module or fewer modules.

As shown, the hash map management module 200 includes an establishment module 202, a detection module 204, an augment module 206, an update module 208, a search module 210, a migrate module 212, a count module 214, a threshold module 216, and a tag module 218. A hash map 220 includes a master table 222 and a set of one or more tables 224. The master table 222 identifies and stores the location of each table 224 in the set. Each of the tables 224 may contain one or more entries 226 in array elements (e.g., buckets or slots). In certain embodiments, each entry 226 includes a key, a value associated with the key, and a hash code associated with the key and providing an index to the array element in which the entry 226 resides. In certain embodiments, the hash code is stored in the first field of the entry 226 since the hash code is typically checked first and the key and value fields may not be checked at all. This minimizes the amount of data that needs to be read upon performing a lookup.

Figure 3:
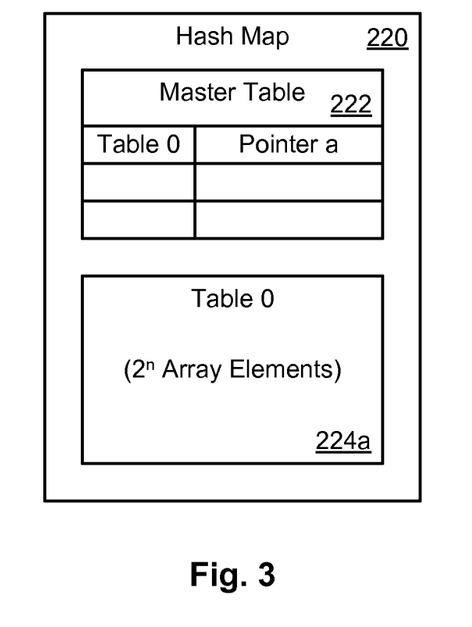
FIG. 3 is a high-level block diagram showing one example of a hash map containing a single table.

In selected embodiments, the establishment module 202 initially establishes a hash map 220 comprising an initial table 224, such as a table 224 having $2^n$ array elements. The establishment module 202 records this table and its location in the master table 222. For example, as shown in FIG. 3, the establishment module 202 may establish a first table 224a (i.e., "Table 0"), having $2^n$ array elements, in the hash map 220. The establishment module 202 records this table 224a in the master table 222 along with a pointer (i.e., "Pointer a") indicating its location.

Figure 4:
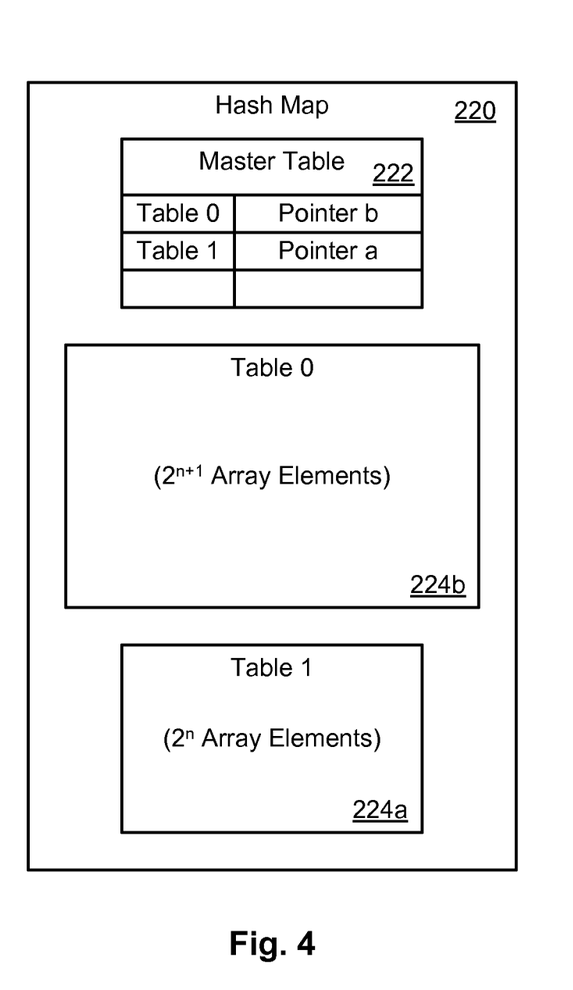
FIG. 4 is a high-level block diagram showing the hash map of FIG. 3 after adding a second table thereto.

A detection module 204 may detect when a table 224 is full or has reached a specified load factor. For the purposes of this description, a table 224 may be considered "full" if it is completely full or has reached some designated load factor (e.g., 75 percent full). Once the detection module 204 detects that the initial table 224a is full, an augment module 206 increases the size of the hash map 220 by adding a new table 224 to the hash map 220, while retaining already existing tables 224 in the hash map 220. For example, as shown in FIG. 4, the augment module 206 adds a second table 224b, containing $2^{n+1}$ array elements, to the hash map 220. In selected embodiments, an update module 208 updates the names of the tables 224 such that the most recently added table 224b becomes "Table 0" and the initial table 224a becomes "Table 1." Although updating the table names is not necessary in all embodiments, it may facilitate searching the tables 224 as will be discussed hereinafter as it relates to the search module 210. Once the table names are updated, the update module 208 may update the master table 222 to include the newly added table 224b and a pointer (i.e., "Pointer b") indicating its location.

Figure 5:
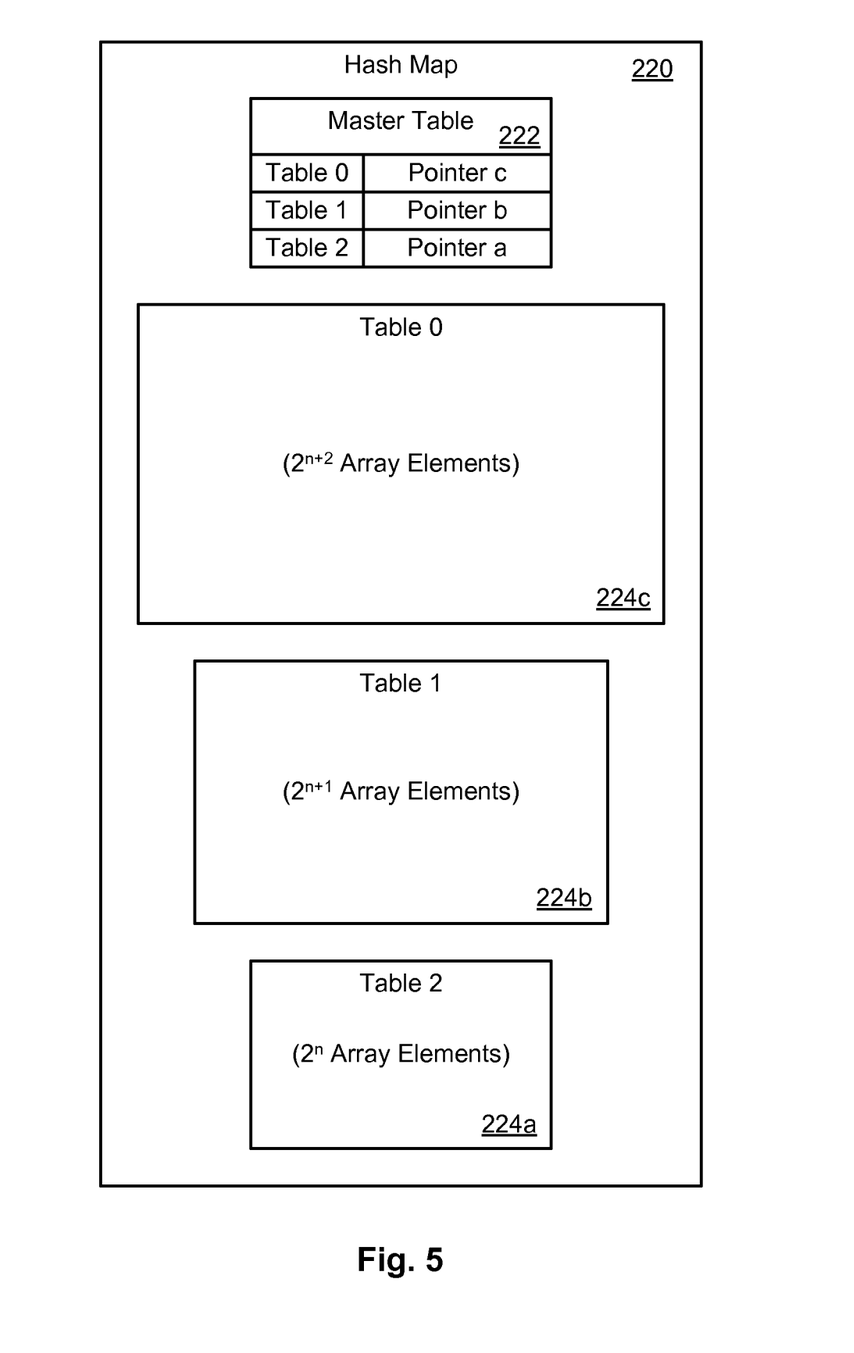
FIG. 5 is a high-level block diagram showing the hash map of FIG. 3 after adding a third table thereto.

In a similar manner, when the detection module 204 detects that the second table 224b is full, the augment module 206 increases the size of the hash map 220 by adding an additional table 224 to the hash map 220. For example, as shown in FIG. 5, the augment module 206 adds a third table 224c, containing $2^{n+2}$ array elements, to the hash map 220. The update module 208 then updates the names of the tables 224 such that the most recently added table 224c becomes "Table 0," the second table 224b becomes "Table 1," and the initial table 224a becomes "Table 2." The update module 208 may then update the master table 222 to reference the newly added table 224c and store a pointer (i.e., "Pointer c") indicating its location. As space is needed, the detection module 204 and augment module 206 may continue to add tables 224 to the hash map 220 in the manner described above.

As mentioned above, in selected embodiments, each table 224 that is added to the hash map 220 may be twice as large as the table 224 that is added before it. This will cause the hash map 220 to grow in an exponential manner as space is added. Nevertheless, the hash map 220 is not limited to growing in this manner. For example, the hash map 220 may be configured to grow faster or slower by adjusting the size of newly added tables 224 relative to previously added tables 224. In certain embodiments, the size of newly added tables 224 may be the same as or smaller than previously added tables 224. For example, if the number of entries 226 in the hash map 220 is increasing slowly, or the rate of increase is slowing, smaller tables 224 may be added to the hash map 220. Thus, the amount by which the hash map 220 grows when a new table 224 is added may be adjusted for different implementations.

Provided a key, the search module 210 may be configured to search the hash map 220 for an entry 226 associated with the key. More specifically, using a hash function, the search module 210 generates a hash code from the key and looks for entries 226 associated with the hash code. In selected embodiments, the search module 210 searches the tables 224 from the most recently added table 224 to the least recently added table 224. The search may be performed in this order since "hotter" data is most likely to be stored in the most recently added tables 224. The most recently added table 224 may also be larger than other tables 224 and thus may store more data. Using the example of FIG. 5, the search module 210 may initially search Table 0. If a matching entry 226 is not found in Table 0, the search module 210 may search Table 1. If a matching entry 226 is not found in Table 1, the search module 210 may search Table 2, and so forth. In this way, the search module 210 may initially search Table 0 and proceed through the remaining tables 224 until a desired entry 226 is found or until all of the tables 224 have been searched.

Nevertheless, the search module 210 is not limited to searching the tables 224 in this order. In other implementations, the search module table 224 may search the tables 224 from the least recently added to most recently added, from largest to smallest, from smallest to largest, or the like, depending on the implementation. In yet other contemplated embodiments, an algorithm may be used to determine the ideal order in which to search the tables, such as an algorithm predicting which table 224 is most likely to contain a desired entry 224.

The search module 210 may use the same hash code (which may include a derivative of the same hash code) to search all of the tables 224 in the hash map 220. In selected embodiments, such as in embodiments where the size of a newly added table 224 is twice that of the previously added table 224, once the hash code is calculated, the search module 210 may use the operation a mod n on the hash code to calculate the index into a particular table 224 in the hash map 220, where a is the hash code and n is the size of the table 224 being searched. This technique improves efficiency because it only requires calculating the hash code a single time to search all of the tables 224. After the hash code is calculated, only the mod operation (a much cheaper operation) is needed to calculate the index into a particular table 224.

A migrate module 212 may be used migrate entries between tables 224 in the hash map 220. For example, the migrate module 212 may be configured to move "hot" data or recently accessed data to the most recently added table 224 (or to the table 224 that is searched first, depending on the implementation). This may improve data locality by ensuring that hot or recently accessed data is located in the first table 224 searched by the search module 210. Such a technique may reduce collisions between hot or recently accessed data with cold or rarely accessed data, when the cold or rarely accessed data is stored in lower level tables 224.

For example, assume that two entries 226, one hot and one cold, are stored in the hash map 220 and are associated with the same hash code. The hot entry 226 is stored in the most recently added table 224 and the cold entry 226 is stored in a less recently added table 224. To search the hash map 220, the search module 210 generates a hash code from the key associated with the hot entry 226. The search module 210 then searches the hash map 220 for the hash code starting with the most recently added table 224. Once the search module 210 encounters the hot entry 226 associated with the hash code and determines that it has located the correct entry, the search module 210 has no need to search other tables 224. Thus, the search module 210 will never encounter the cold entry 226, thereby avoiding the collision. In this way, performance may be improved by placing or migrating hotter entries to the table or tables that are searched first, and placing or migrating colder entries to the table or tables 224 that are searched last.

In selected embodiments, when an entry 226 is updated by way of a "put" operation, the migrate module 212 is configured to migrate the entry 226 to the most recently added table 224. This is because a "put" operation will generally place a lock on the hash map 220 and a lock may be required to migrate an entry 226 from one table 224 to another. On the other hand, when a "get" operation is performed to locate an entry 226, a lock may not be placed on the hash map 220 since multiple "get" operations may be executed on a hash map 220 concurrently. In such a case, the entry 226 may be tagged so that it is migrated to the most recently added table 224 the next time a "put" operation is performed.

In other embodiments, a specified number of "put" or "get" operations may be required before migrating an entry 226 to the most recently added table 224. In such embodiments, a count module 214 may be configured to maintain a count value for each entry 226 in the hash map 220. When an entry 226 is accessed by way of a "put" or "get" operation, the count module 214 may increment the count value of the entry 226. A threshold module 216 may determine when the count value has reached a designated threshold value. The threshold value could be any value (e.g., 10) and in the simplest case is one. If the count value has reached the threshold value, the threshold module 216 may invoke a tag module 218 to tag the entry for migration. The migrate module 212 may then migrate the entry 226 the next time a lock is placed on hash map 220, such as the next time a "put" operation is performed on an entry 226 in the hash map 220.

In selected embodiments, one or more migration slots may be provided to store tags. The tag module 218 may be configured to write to the migration slots. For example, when the count threshold for an entry 226 is reached, the tag module 218 may simply write an index or other identifying information associated with the entry 226 to the migration slot. The next time a lock is placed on the hash map 220, the migrate module 212 may read the migration slot and migrate the entry 226 that is identified in the slot. Since more than one entry 226 could potentially reach the count threshold before the next lock is placed on the hash map 220, in selected embodiments multiple migration slots may be provided to store the identities of multiple entries 226. The next time a lock is placed on the hash map 220, the migrate module 212 may read the multiple migration slots and migrate the entries 226 identified therein.

Figure 6:
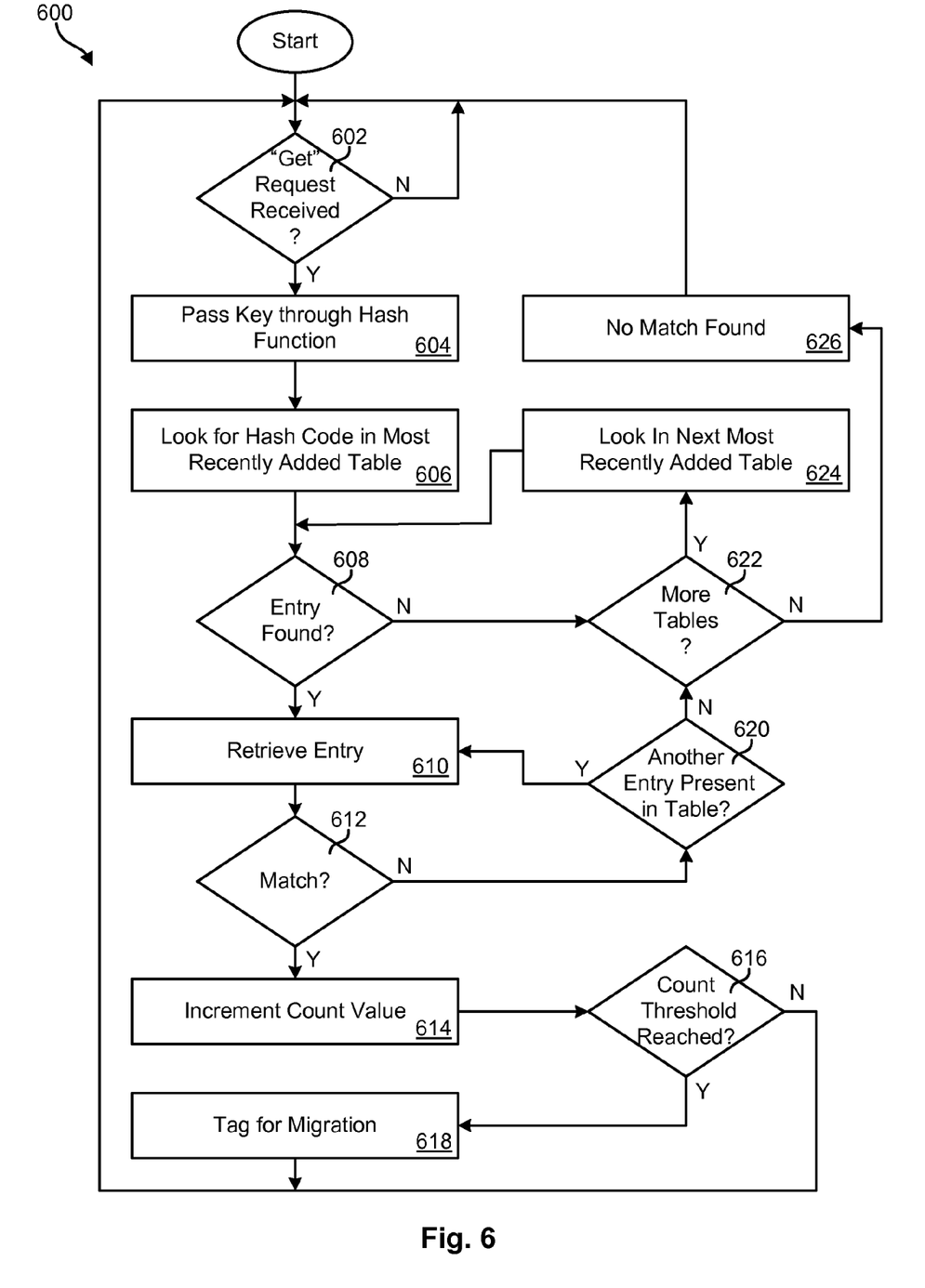
FIG. 6 is a flow diagram showing one embodiment of a method performed for a "get" operation.

Referring to FIG. 6, one embodiment of a method 600 performed for a "get" operation is illustrated. As shown, upon receiving a "get" request at step 602, the method 600 passes 604 the key associated with the "get" request through a hash function to generate a hash code. The method 600 then looks 606 for the hash code in the most recently added table 224. In certain embodiments, the hash code is transformed (such as using the mod operation discussed above) prior to looking 606 for the hash code in the most recently added table 226. If, at step 608, an entry associated with the hash code is found, the method 600 retrieves 610 the entry and determines 612 whether the key in the entry matches the key received at step 604. If a match is found, the method 600 increments 614 the count value for the entry 226 and determines 616 whether the count threshold has been reached. If the count threshold has been reached, the method 600 tags 618 the entry for migration.

If no match is found at step 612, the method determines 620 whether another entry 226 associated with the same hash code is present in the current table 224 being searched. If so, the method 600 retrieves 610 the entry 226 and determines 612 whether the key associated with the entry 226 matches the key associated with the "get" request received at step 602. If so, the method 600 performs the steps 614, 616, 618 previously discussed. If not, the method 600 performs steps 620, 610, 612 until a matching entry is found or the last entry 226 in the current table 224 is reached.

If the last entry 226 in the current table 224 is reached, the method 600 determines 622 whether the hash map 220 contains more tables 224. If so, the method 600 looks 624 in the next most recently added table 224. The method 600 looks through this table 224 in the manner described above until a matching entry 226 is found or the last entry 226 in the table 224 is reached. This process is repeated for all remaining tables 224 in the hash map 220 until a matching entry 226 is found or the end of the last table 224 is reached. In the event no match is found, as shown at step 626, the method 600 ends and waits 602 for the next "get" request.

Figure 7:
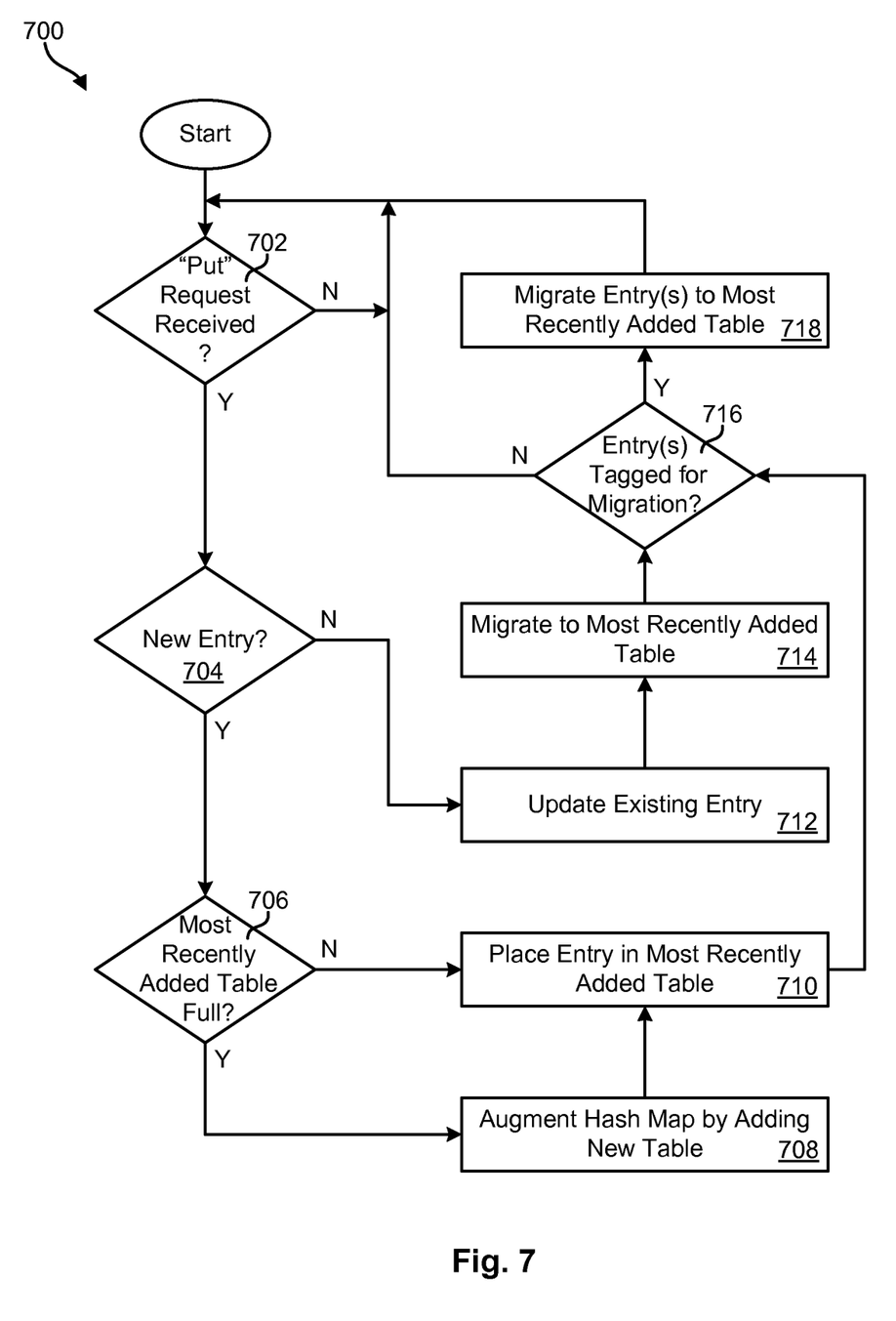
FIG. 7 is a flow diagram showing one embodiment of a method performed for a "put" operation.

Referring to FIG. 7, one embodiment of a method 700 performed for a "put" operation is illustrated. As shown, the method 700 initially waits 702 for a "put" request. Upon receiving the put request, the method 700 determines 704 whether the "put" request is to insert a new entry 226 into the hash map 220 or to update an existing entry 226 in the hash map 220. If the request is to insert a new entry 226, the method 700 determines 706 whether the most recently added table 224 is full. This may include determining 706 whether the most recently added table 224 is completely full or has reached some designated load factor (e.g., 75 percent full). If the most recently added table 224 is full, the method 700 augments 708 the hash map 220 by adding a new table 224. The method 700 then places 710 the new entry 226 in the newly added table 224. On the other hand, if the method 700 determines 706 that the most recently added table 224 is not full, the method 700 places 710 the new entry 226 in the most recently added table 224. Placing 710 an entry 226 in the most recently added table 226 may include first placing a lock on the hash map 220.

In the event at step 704 the "put" request is not for a new entry 226 but to update an existing entry 226, the method 700 updates 712 the existing entry 226. In doing so, the method 700 may first locate the existing entry 226 using steps 604, 606, 608, 610, 612, 620, 622, 624 similar to those illustrated in FIG. 6. Updating 712 an entry 226 may include first placing a lock on the hash map 220. While the lock is in place, the method 700 may migrate 714 the updated entry 226 to the most recently added table 224. Alternatively, at step 714, the method 700 may increment a count value associated with the entry 226 and, if the count value has reached a threshold value, tag the entry for migration.

At step 716, the method 700 determines whether any entries 226 have been tagged for migration. In selected embodiments, this may include reading the migration slot(s) previously discussed. Using the lock that was placed on the hash map 220 to perform step 710 or step 712, the method 700 migrates 718 the entries 226 that have been tagged for migration at this time. Once the migration has been performed, the method 700 unlocks the hash map 220 and waits 702 for the next "put" request.

The methods 600, 700 presented in FIGS. 6 and 7 are presented only by way of example and are not intended to be limiting. One of skill in the art will recognize that various alterations may be made to methods 600, 700 without departing from the essence or characteristics of the invention. The methods 600, 700 are simply presented to show one possible implementation of a real-time hash map in accordance with the invention.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for implementing a hash map to improve performance consistency, the method comprising:
    providing, by a processor, a hash map comprising a set of tables, the set of tables comprising a first table;
    when the first table is full, augmenting the hash map by adding a second table to the set of tables, wherein the second table is larger than the first table;
    when the second table is full, augmenting the hash map by adding a third table to the set of tables, wherein the third table is larger than the second table; and
    using the same hash code to search for a value in any of the tables belonging to the set of tables, wherein searching for the value comprises searching through the set of tables from the most recently added table to the least recently added table until the value is found.

2. The method of claim 1, wherein the first table contains $2^{n+2}$ array elements, the second table contains $2^{n+1}$ array elements, and the third table contains $2^{n+2}$ array elements.

3. The method of claim 1, further comprising migrating an entry to the most recently added table in the event at least one of a "get" and "put" operation is performed on the entry, and the entry is not already in the most recently added table.

4. The method of claim 1, further comprising maintaining a count value for an entry and incrementing the count value each time one of a "get" and "put" operation is performed on the entry.

5. The method of claim 4, further comprising migrating the entry to the most recently added table if the count value reaches a designated threshold, and the entry is not already in the most recently added table.

6. The method of claim 1, wherein searching for the value comprises searching through the set of tables from the largest table to the smallest table until the value is found.

7. A computer program product to implement a real-time hash map, the computer program product comprising:
    a computer-readable storage medium having computer-usable program code embodied therein, the computer-usable program code comprising:
        computer-usable program code to provide a hash map comprising a set of tables, the set of tables comprising a first table;
        computer-usable program code to, upon detecting that the first table is full, augment the hash map by adding a second table to the set of tables, wherein the second table is larger than the first table;
        computer-usable program code to, upon detecting that the second table is full, augment the hash map by adding a third table to the set of tables, wherein the third table is larger than the second table; and
        computer-usable program code to use the same hash code to search for a value in any of the tables belonging to the set of tables, wherein searching for the value comprises searching through the set of tables from the most recently added table to the least recently added table until the value is found.

8. The computer program product of claim 7, wherein the first table contains $2^{n+n}$ array elements, the second table contains $2^{n+1}$ array elements, and the third table contains $2^{n+2}$ array elements.

9. The computer program product of claim 7, further comprising computer- usable program code to migrate an entry to the most recently added table in the event at least one of a "get" and "put" operation is performed on the entry, and the entry is not already in the most recently added table.

10. The computer program product of claim 7, further comprising computer- usable program code to maintain a count value for an entry and increment the count value each time one of a "get" and "put" operation is performed on the entry.

11. The computer program product of claim 10, further comprising computer- usable program code to migrate the entry to the most recently added table if the count value reaches a designated threshold, and the entry is not already in the most recently added table.

12. The computer program product of claim 7, wherein the set of tables includes a master table containing pointers to tables within the set of tables.

13. An apparatus to implement a hash map to improve performance consistency, the apparatus comprising:
    a plurality of modules, each module implemented in at least one of hardware and software operating hardware, the plurality of modules comprising:
        an establishment module to establish a hash map comprising a set of tables, the set of tables comprising a first table;
        an augment module to, upon detecting that the first table is full, augment the hash map by adding a second table to the set of tables, wherein the second table is larger than the first table;
        the augment module further configured to, upon detecting that the second table is full, augment the hash map by adding a third table to the set of tables, wherein the third table is larger than the second table; and
        a search module to use the same hash code to search for a value in any of the tables belonging to the set of tables, wherein searching for the value comprises searching through the set of tables from the most recently added table to the least recently added table until the value is found.

14. The apparatus of claim 13, wherein the first table contains $2^{2+n}$ array elements, the second table contains $2^{n+1}$ array elements, and the third table contains $2^{n+2}$ array elements.

15. The apparatus of claim 13, further comprising a migrate module to migrate an entry to the most recently added table in the event at least one of a "get" and "put" operation is performed on the entry, and the entry is not already in the most recently added table.

16. The apparatus of claim 13, further comprising a count module to maintain a count value for an entry and increment the count value each time one of a "get" and "put" operation is performed on the entry.

17. The apparatus of claim 16, further comprising a migrate module to migrate the entry to the most recently added table if the count value reaches a designated threshold, and the entry is not already in the most recently added table.

18. The apparatus of claim 13, wherein the search module references a master table containing pointers to tables within the set.

19. A method for implementing a hash map to improve performance consistency, the method comprising:
- providing, by a processor, a hash map comprising a set of tables, the set of tables comprising a first table having $2^n$ array elements;
- when the first table is full, augmenting the hash map by adding a second table having $2^{n+1}$ array elements to the set of tables;
- when the second table is full, augmenting the hash map by adding a third table having $2^{n+2}$ array elements to the set of tables; and
- using the same hash code to search for a value in any of the tables belonging to the set of tables, wherein searching for the value comprises searching through the set of tables from the most recently added table to the least recently added table until the value is found.

* * * * *